Figure 1:
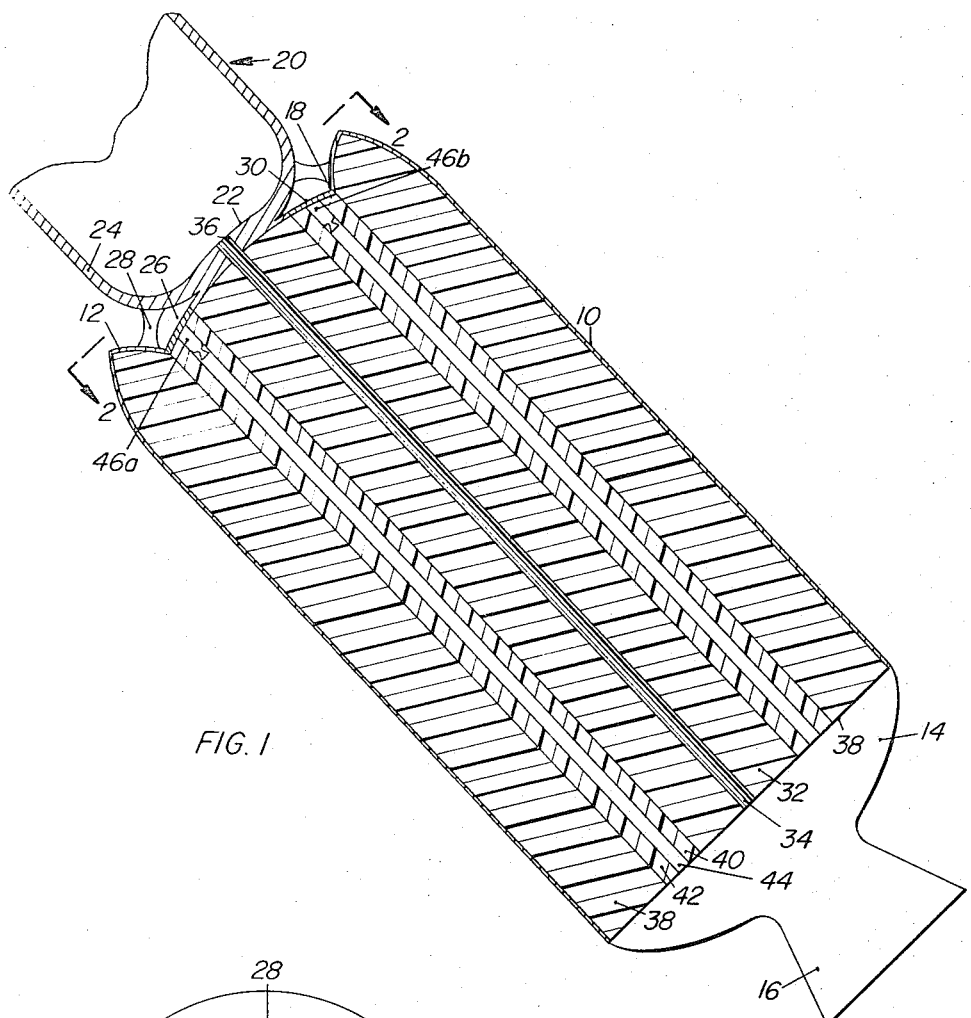

Dec. 12, 1967  C. M. WHITLOCK, JR  3,357,187
DUCTED ROCKET MOTOR
Filed March 14, 1966

INVENTOR.
COLEMAN M. WHITLOCK JR.
BY Edwin D. Grant

ATTORNEY

# United States Patent Office 3,357,187
Patented Dec. 12, 1967

3,357,187
DUCTED ROCKET MOTOR
Coleman M. Whitlock, Jr., Camp Hill, Pa., assignor to Thiokol Chemical Corporation, Bristol, Pa., a corporation of Delaware
Filed Mar. 14, 1966, Ser. No. 533,977
3 Claims. (Cl. 60—250)

This invention relates to rocket motors and more particularly to an improved rocket motor.

To minimize the weight of a solid propellant rocket motor, it has been proposed heretofore to incorporate two different kinds of solid propellant charges therein, namely, a charge that contains both fuel and oxidizer materials and is therefore capable of supporting combustion by itself, and a second charge that contains a fuel material but is lacking or deficient in oxidizer material and thus cannot support combustion without contact with an oxidizer. Such a rocket motor can be propelled by combustion of the self-combustible charge to a supersonic velocity at which atmospheric air can be introduced into the rocket motor, through suitable ducts formed therein, to provide oxygen for combustion of the charge which is lacking or deficient in oxidizer material and to add working fluid. However, previously proposed designs for rocket motors of the type described, which are commonly termed "ducted rocket motors," have not been satisfactory in all respects. The previously proposed solid propellant ducted rocket motors utilize two combustion chambers, which is a disadvantageous arrangement for several reasons, e.g., it may increase the weight and size of such a rocket motor.

The present invention provides a single-chamber, ducted rocket motor that develops a comparatively high thrust during the initial portion of its firing period. This operational advantage is achieved by a preferred embodiment of the invention that, briefly described, comprises a first pair of solid propellant charges which are disposed in a rocket motor casing in concentric, spaced relation and which are composed mainly of a fuel material; a second pair of solid propellant charges which respectively abut different ones of said first pair of charges and which are composed of both fuel and oxidizer materials, such second pair of charges being spaced apart radially of said casing to provide an annular passage therebetween which extends longitudinally of said rocket motor casing; and a combustible barrier which is positioned within an annular opening formed in the forward end of said rocket motor casing and which is burned after said fuel-oxidizer charges are ignited to thereby permit atmospheric air to flow through said opening and between said charges of fuel material.

It is accordingly a broad object of this invention to provide an improved solid propellant rocket motor of the ducted type.

Another object of this invention is to provide a ducted solid propellant rocket motor that is capable of developing relatively high thrust during the initial portion of its firing period.

Still another object of this invention is to provide a ducted rocket motor including solid propellant fuel charges (i.e., charges which contain a fuel but lack, or are deficient in, an oxidizer) and solid propellant fuel-oxidizer charges (i.e., charges which contain both a fuel and an oxidizer) that are arranged within the casing of said rocket motor so as to possess relatively large burning surfaces.

A further object of this invention is to provide a ducted rocket motor including solid propellant fuel charges and solid propellant fuel-oxidizer charges that are arranged within the casing of solid rocket motor so that the unused space therein is minimized.

An additional object of this invention is to provide an effective ducted rocket motor the thrust of which can be terminated in the initial portion of its firing period.

Figure 2:
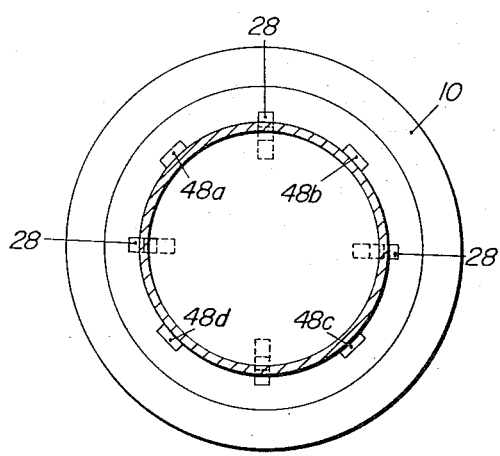

Other objects and advantages of the present invention will become apparent in the following description of a rocket motor constituting a preferred embodiment thereof, in which description reference is made to the accompanying drawings wherein:

FIGURE 1 is a sectional view illustrating said rocket motor, taken along the longitudinal axis thereof; and, FIGURE 2 is a cross-sectional view illustrating said rocket motor, taken along the plane represented by line 2—2 of FIGURE 1.

Throughout the specification and drawings the same reference numbers refer to the same parts.

As illustrated in FIGURE 1, a rocket motor constituting a preferred embodiment of this invention comprises a tubular casing 10 with forward and aft end closures 12, 14 fixedly joined to opposite ends thereof. A convergent-divergent thrust nozzle 16 is fixedly mounted on aft end closure 14. Forward end closure 12 curves inwardly and rearwardly from the juncture of its peripheral edge with the convergent forward end of casing 10, and the end closure is formed with a circular perforation 18 that is coaxial with the longitudinal axis of casing 10. A support member, generally designated by reference number 20, includes a disk-shaped portion 22 that is disposed substantially perpendicular to the longitudinal axis of said casing and coaxial therewith, and a tubular portion 24 of circular cross-section that projects from the forward end of the rocket motor. The periphery of support member 20 is evenly spaced from the edge of perforation 18 to form an annular opening 26 in the forward end of the rocket motor, and said support member 20 is fixedly connected to forward end closure 12 by means of a plurality of struts 28 that are evenly spaced circumferentially thereof. Positioned within opening 26 is an annular barrier 30 formed of a combustible material, such as a plastic. A first rod-shaped charge 32 is axially disposed within casing 10 with the forward end thereof fixedly mounted on support member 20. More specifically, the forward end surface of charge 32 is bonded to the aft surface of portion 22 of support member 20 by a suitable adhesive, and a support rod 34 extends longitudinally of said charge and is itself mounted within an aperture 36 formed in said portion 22. In the preferred embodiment of the invention, charge 32 is a solid propellant consisting mainly of fuel material. A second charge 38, formed of the same solid propellant used for charge 32, is disposed around charge 32 in spaced relation therewith, the peripheral surface of said charge 38 being bonded to the inner surface of casing 10 by a suitable adhesive. It can be seen in FIGURE 1 that the thickness of charge 38 is approximately one-half the diameter of charge 32, and the two charges are longitudinally co-extensive, their aft surfaces terminating at the forward end of aft end closure 14. It will also be noted that the peripheral surface of charge 32 is even with the edge of portion 22 of support member 20, and that the inner surface of charge 38 is even with the edge of perforation 18 in end closure 12. A third charge 40 is disposed around charge 32 and bonded at its inner surface thereto, and a fourth charge 42 is disposed around said charges 32 and 40 and bonded at its peripheral surface to the inner surface of charge 38, the inner surface of said charge 42 being spaced from the peripheral surface of charge 40 to provide an annular passage 44 therebetween which extends longitudinally of casing 10 and the forward end of which is adjacent barrier 30. Charges 40 and 42 are formed of a solid propellant consisting of both fuel and oxidizer materials. If desired, charges 40 and 42 can be joined together at their forward ends. However, if the forward ends of charges 40 and 42 are joined together, the thickness of propellant between barrier 30 and passage 44 is made less than the thickness of charges 40 and 42 in a direction radial to casing 10, so that when said charges 40 and 42 are ignited as described hereinafter, the flame of combustion of said charges reaches barrier 30 prior to the time it reaches charges 32 and 38. Two pyrotechnic igniters 46a, 46b are disposed against barrier 30 and bonded thereto by a suitable adhesive, these igniters being adapted to discharge high-temperature gas into passage 44 when actuated by means of conventional electrical firing circuits (not shown). As illustrated in FIGURE 2, the rocket motor is also provided with four explosive devices 48a through 48d which are mounted on support member 20 and connected to signal receiving apparatus (not shown) by means of which they can be actuated from a remote point at a selected time, the discharge end of each of these devices being adjacent barrier 30.

A payload or another rocket stage can be connected to support member 20 of the above-described rocket motor. When the rocket motor is to be fired, igniters 46a, 46b are actuated to ignite the adjacent, longitudinally extending surfaces of charges 40 and 42. Since these charges contain both fuel and oxidizer materials, they are self-combustible, and the rocket motor is accelerated by the products of combustion thereof. In contrast to prior art rocket motors which utilize a solid propellant that is lacking or deficient in oxidizer material and an initially fired solid propellant that contains both fuel and oxidizers, the rocket motor herein disclosed produces a large thrust during the initial portion of its firing period, the arrangement of charges 40 and 42 providing relatively large burning surfaces which extend longitudinally of casing 10. Therefore, when charges 40 and 42 have been consumed the rocket motor has attained a high velocity. During the burning of charges 40 and 42, the high-temperature gas within passage 44 is also eroding the inner surface of barrier 30. The thickness of barrier 30 is such that the barrier is burned through immediately before the burning surfaces of charges 40 and 42 have reached the peripheral surface of charge 32 and the inner surface of charge 38 respectively. At this point, atmospheric air is permitted to flow through opening 26 and into the annular passage between charges 32 and 38. Since the rocket motor is moving at a high velocity at the point of burnout of charges 40 and 42, air is forced through opening 26 in sufficient quantity to support combustion of charges 32 and 38, thus making the rocket motor, in effect, a solid-fuel ram-jet.

Thrust of the rocket motor can be terminated during the combustion of charges 40 and 42 by means of the explosive devices 48, which can be actuated to remove the adjacent portions of barrier 30 and thereby permit head end exhaust of combustion gases through opening 26. Thus the thrust of the rocket motor can be terminated before its velocity is high enough to force air through opening 26 in sufficient quantities to support combustion of charges 32 and 38.

It will be readily apparent to persons skilled in the art of rocketry that various modifications can be made in the described and illustrated rocket motor without departing from the scope of the invention as defined in the appended claims. For example, charges 32 and 38 can be made of solid propellant containing a fuel material only, or of a fuel material combined with an amount of oxidizer that is insufficient to support combustion without the atmospheric air admitted through opening 26 after barrier 30 is removed by combustion of charges 40 and 42. Furthermore, charges 40 and 42 can obviously be formed of numerous well-known solid propellants comprising both fuel and oxidizer materials. Should atmospheric exit occur prior to burn out of charges 32 and 38, conventional means can be employed to close the opening 26 at the forward end of the rocket motor and to supply oxygen to allow continued burning of the charges. In rocket motors of large size, support rod 34 can advantageously be braced by support members that extend between its aft end and casing 10 or aft end closure 14. It will also be obvious that a payload or additional rocket stage can be joined to casing 10 rather than to support member 20. Therefore, the scope of the invention is to be considered as limited only by the terms of the appended claims.

What is claimed is:

1. A rocket motor comprising a tubular casing, an aft end closure joined to said casing, at least one thrust nozzle fixedly mounted on said aft end closure, a forward end closure fixedly joined to said casing and formed with a circular perforation that is coaxial with the longitudinal axis of said casing, a support member the periphery of which is evenly spaced from the edge of said perforation so as to form an annular opening in the forward end of said rocket motor, a plurality of struts fixedly connecting said support member to said forward end closure, an annular, combustible barrier positioned within said opening, a first rod-shaped solid propellant charge of fuel material axially disposed within said casing with the forward end thereof fixedly mounted on said support member, a second solid propellant charge of fuel material disposed around said first charge in spaced relation therewith and bonded at its peripheral surface to said casing, a third solid propellant charge of fuel and oxidizer materials disposed around said first charge and bonded at its inner surface thereto, a fourth solid propellant charge of fuel and oxidizer materials disposed around said first and third charges and bonded at its peripheral surface to said second charge, the inner surface of said fourth charge being spaced from the peripheral surface of said third charge to provide an annular passage therebetween which extends longitudinally of said casing and the forward end of which is adjacent said barrier, said charges being substantially longitudinally coextensive, and means carried by said rocket motor and adapted to ignite said third and fourth charges whereby said rocket motor is accelerated to a predetermined velocity by combustion thereof and whereby said barrier is burned so that atmospheric air is permitted to flow through said opening and between said first and second charges.

2. The rocket motor defined in claim 1 wherein said first and second charges also contain oxidizer material.

3. The rocket motor defined in claim 1 including means carried by said rocket motor and adapted to remove said barrier from said opening to terminate the thrust of said rocket motor at a selected time.

References Cited
UNITED STATES PATENTS

| | | | |
|---|---|---|---|
| 2,956,401 | 10/1960 | Kane | 60—250 |
| 3,040,517 | 6/1962 | Ryden | 60—270 X |
| 3,115,008 | 12/1963 | Cohen et al. | 60—270 X |
| 3,128,600 | 4/1964 | Oldham | 60—250 |

CARLTON R. CROYLE, *Primary Examiner.*